United States Patent
Galvan Mijangos et al.

(10) Patent No.: US 9,664,871 B1
(45) Date of Patent: May 30, 2017

(54) FIBER OPTIC DRAWER TRAY HAVING ROTATABLE SPOOL FOR DEPLOYMENT OF FIBER OPTIC CABLE, AND RELATED COMPONENTS, SYSTEMS, AND METHODS

(71) Applicant: CORNING OPTICAL COMMUNICATION LLC, Hickory, NC (US)

(72) Inventors: Cesar Alberto Galvan Mijangos, Tamaulipas (MX); Arturo Parra Morales, Tamaulipas (MX); Guadalupe Rodriguez Sanchez, Tamaulipas (MX)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/946,018

(22) Filed: Nov. 19, 2015

(51) Int. Cl.
   *G02B 6/00* (2006.01)
   *G02B 6/44* (2006.01)
   *G02B 6/38* (2006.01)

(52) U.S. Cl.
   CPC ......... *G02B 6/4455* (2013.01); *G02B 6/3897* (2013.01); *G02B 6/4452* (2013.01); *G02B 6/4457* (2013.01)

(58) Field of Classification Search
   CPC .. G02B 6/4452; G02B 6/3897; G02B 6/4471; G02B 6/4453; G02B 6/4454
   See application file for complete search history.

(56) References Cited

U.S. PATENT DOCUMENTS

| | | | |
|---|---|---|---|
| 6,014,713 A | 1/2000 | Agnew et al. | |
| 8,265,447 B2 * | 9/2012 | Loeffelholz | G02B 6/4441 385/135 |
| 8,428,419 B2 | 4/2013 | LeBlanc et al. | |
| 8,938,147 B2 | 1/2015 | Krampotich et al. | |
| 9,052,490 B2 | 6/2015 | Kewitsch | |
| 9,223,106 B2 * | 12/2015 | Coan | G02B 6/445 |
| 2005/0226588 A1 | 10/2005 | Pons | |

* cited by examiner

*Primary Examiner* — Jennifer Doan

(57) ABSTRACT

A fiber optic drawer tray for fiber optic equipment having a rotatable spool for deployment of fiber optic cable comprises a horizontal base and a pair of housing engagement features on opposite sides of the horizontal base, for movably engaging with at least one tray engagement feature of a drawer housing. The fiber optic drawer tray also comprises a rotatable spool disposed on the base, and a fiber optic adapter sub-assembly configured to receive and retain a plurality of fiber optic adapters mounted to the rotatable spool. The spool is further configured to store a length of fiber optic cable wound around the spool. The fiber optic cable can be terminated by a plurality of connectors and can be connected to the plurality of adapters. The spool is continuously rotatable to spool or unspool the fiber optic cable without disconnecting the plurality of connectors.

22 Claims, 8 Drawing Sheets

FIBER OPTIC DRAWER TRAY HAVING ROTATABLE SPOOL FOR DEPLOYMENT OF FIBER OPTIC CABLE, AND RELATED COMPONENTS, SYSTEMS, AND METHODS

BACKGROUND

The disclosure relates generally to a fiber optic drawer tray for a fiber optic housing, and more particularly to a fiber optic drawer tray having a rotatable spool which may be used in deployment of fiber optic cable, and related components, systems, and methods.

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections. For example, the fiber optic equipment can support interconnections between servers, storage area networks (SANs), and other equipment at data centers. Interconnections may be supported by fiber optic patch panels or modules.

The fiber optic equipment is typically included in housings that are mounted in equipment racks to optimize use of space. One challenge with fiber optic housing installations relates to interconnections between fiber optic components in different housings within an installation. One common solution is the use of jumper cables or other types of fiber optic cable interconnects to connect components in one housing to components in another housing within the fiber optic rack or in another fiber optic rack. However, different jumper cables have varying lengths, which may not correspond to a desired length for a particular interconnect between components in different housings within a fiber optic installation. Accordingly, there is a need for an efficient and cost-effective system for distributing cable within a fiber optic installation.

No admission is made that any reference cited herein constitutes prior art. Applicant expressly reserves the right to challenge the accuracy and pertinency of any cited documents.

SUMMARY

Embodiments include a fiber optic drawer tray for fiber optic equipment having a rotatable spool for deployment of fiber optic cable, and related components, systems, and methods. In this regard, in one aspect, the fiber optic drawer tray comprises a horizontal base and a pair of housing engagement features on opposite sides of the horizontal base. The fiber optic drawer tray is configured to movably engage with at least one tray engagement feature of a drawer housing. The fiber optic drawer tray also comprises a rotatable spool disposed on the base, and a fiber optic adapter sub-assembly mounted to the rotatable spool. The fiber optic adapter sub-assembly is configured to receive and retain a plurality of fiber optic adapters. The fiber optic adapter sub-assembly and the rotatable spool are configured to rotate together with respect to the base of the fiber optic drawer tray. The spool is further configured to store a length of fiber optic cable wound around the spool. The fiber optic cable can be terminated by a plurality of connectors and can be connected to the plurality of adapters. The spool is continuously rotatable for a plurality of revolutions with respect to the base to spool or unspool the fiber optic cable without removing the plurality of connectors from the plurality of adapters. One non-limiting advantage of this fiber optic drawer tray is that fiber can be distributed from the fiber optic drawer tray without disconnecting the fiber optic cable from the plurality of fiber optic adapters, and without the need for additional jumper cables having different lengths.

One embodiment of the disclosure relates to a fiber optic drawer tray for fiber optic equipment. The fiber optic drawer tray comprises a horizontal base and a pair of housing engagement features disposed on opposite sides of the horizontal base. Each of the pair of housing engagement features is configured to movably engage with at least one tray engagement feature of a drawer housing. The fiber optic drawer tray further comprises a rotatable spool disposed on the base. The fiber optic drawer tray further comprises a fiber optic adapter sub-assembly mounted to rotatable spool. The fiber optic adapter sub-assembly is configured to receive and retain a plurality of fiber optic adapters, the fiber optic adapter sub-assembly and the rotatable spool configured to rotate together with respect to the base of the fiber optic drawer tray. The rotatable spool is configured to store a length of a fiber optic cable wound around the rotatable spool. The fiber optic cable comprises a plurality of optical fibers terminated by a plurality of connectors configured to be disposed in the plurality of fiber optic adapters in the fiber optic adapter sub-assembly. The rotatable spool is continuously rotatable for a plurality of revolutions with respect to the base to spool or unspool the fiber optic cable without removing the plurality of connectors from the plurality of adapters in the fiber optic adapter sub-assembly.

An additional embodiment of the disclosure relates to a fiber optic chassis. The fiber optic chassis comprises a drawer housing defining an interior volume. The drawer housing comprises a pair of side walls on opposite sides of the interior volume. Each side wall has at least one tray engagement feature. The chassis further comprises at least one fiber optic drawer tray for fiber optic equipment. Each fiber optic drawer tray comprises a horizontal base and a pair of housing engagement features disposed on opposite sides of the horizontal base. Each of the pair of housing engagement features is configured to movably engage with at least one tray engagement feature of the drawer housing. The fiber optic drawer tray further comprises a rotatable spool disposed on the base. The fiber optic drawer tray further comprises a fiber optic adapter sub-assembly mounted to rotatable spool. The fiber optic adapter sub-assembly is configured to receive and retain a plurality of fiber optic adapters, the fiber optic adapter sub-assembly and the rotatable spool configured to rotate together with respect to the base of the fiber optic drawer tray. The rotatable spool is configured to store a length of a fiber optic cable wound around the rotatable spool. The fiber optic cable comprises a plurality of optical fibers terminated by a plurality of connectors configured to be disposed in the plurality of fiber optic adapters in the fiber optic adapter sub-assembly. The rotatable spool is continuously rotatable for a plurality of revolutions with respect to the base to spool or unspool the fiber optic cable without removing the plurality of connectors from the plurality of adapters in the fiber optic adapter sub-assembly.

An additional embodiment of the disclosure relates to a method of storing fiber optic cable. The method comprises providing a fiber optic cable having a first end and a second end, the fiber optic cable comprising a plurality of optical fibers. Each optical fiber is terminated with fiber optic connectors at the first end of the fiber optic cable. The method further comprises connecting each of the plurality of fiber optic connectors to a plurality of fiber optic adapters. The plurality of fiber optic adapters are connected to a rotatable spool rotatably mounted to a base of a fiber optic drawer tray. The method further comprises continuously rotating the spool in a first direction for a plurality of revolutions with respect to the base of the fiber optic drawer tray such that the fiber optic cable winds around the spool without removing the plurality of connectors from the plurality of adapters.

An additional embodiment of the disclosure relates to a method of distributing fiber optic cable. The method comprises horizontally moving a fiber optic drawer tray out of an interior volume of a drawer housing. The method further comprises continuously rotating a rotatable spool rotatably mounted to the fiber optic drawer tray for a plurality of revolutions with respect to a base of the fiber optic drawer tray to unwind a predetermined length of the fiber optic cable between the second end of the fiber optic cable and the rotatable spool without removing the plurality of fiber optic connectors from the plurality of fiber optic adapters.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments include a fiber optic drawer tray for fiber optic equipment having a rotatable spool for deployment of fiber optic cable, and related components, systems, and methods. In this regard, in one aspect, the fiber optic drawer tray comprises a horizontal base and a pair of housing engagement features on opposite sides of the horizontal base. The fiber optic drawer tray is configured to movably engage with at least one tray engagement feature of a drawer housing. The fiber optic drawer tray also comprises a rotatable spool disposed on the base, and a fiber optic adapter sub-assembly mounted to the rotatable spool. The fiber optic adapter sub-assembly is configured to receive and retain a plurality of fiber optic adapters. The fiber optic adapter sub-assembly and the rotatable spool are configured to rotate together with respect to the base of the fiber optic drawer tray. The spool is further configured to store a length of fiber optic cable wound around the spool. The fiber optic cable can be terminated by a plurality of connectors and can be connected to the plurality of adapters. The spool is continuously rotatable for a plurality of revolutions with respect to the base to spool or unspool the fiber optic cable without removing the plurality of connectors from the plurality of adapters. One non-limiting advantage of this fiber optic drawer tray is that fiber can be distributed from the fiber optic drawer tray without disconnecting the fiber optic cable from the plurality of fiber optic adapters, and without the need for additional jumper cables having different lengths.

Figure 1A:
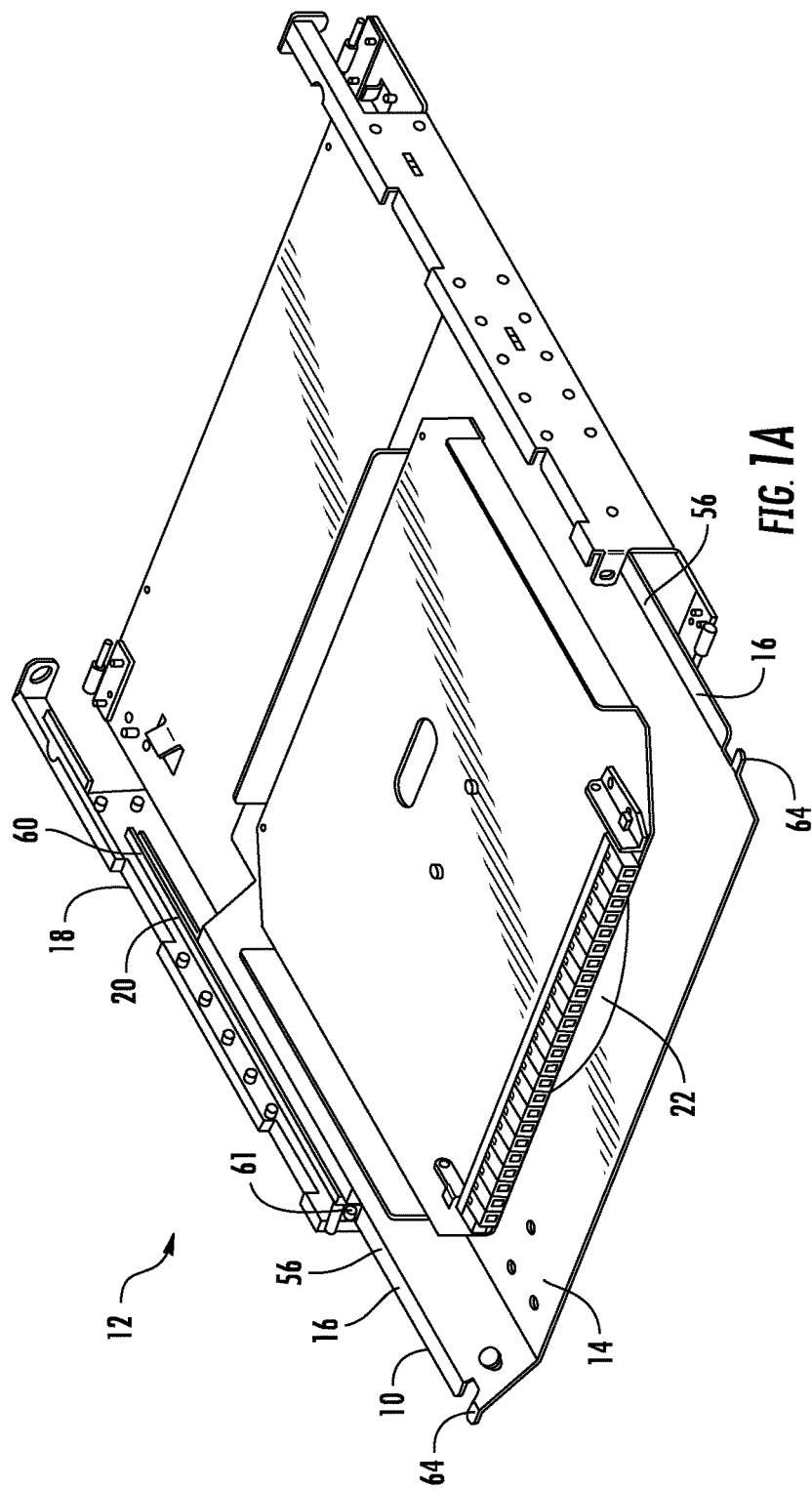
FIG. 1A is an isometric view of a fiber optic chassis having a fiber optic drawer tray with a rotatable spool for distributing fiber optic cable, according to an embodiment.
Figure 1B:
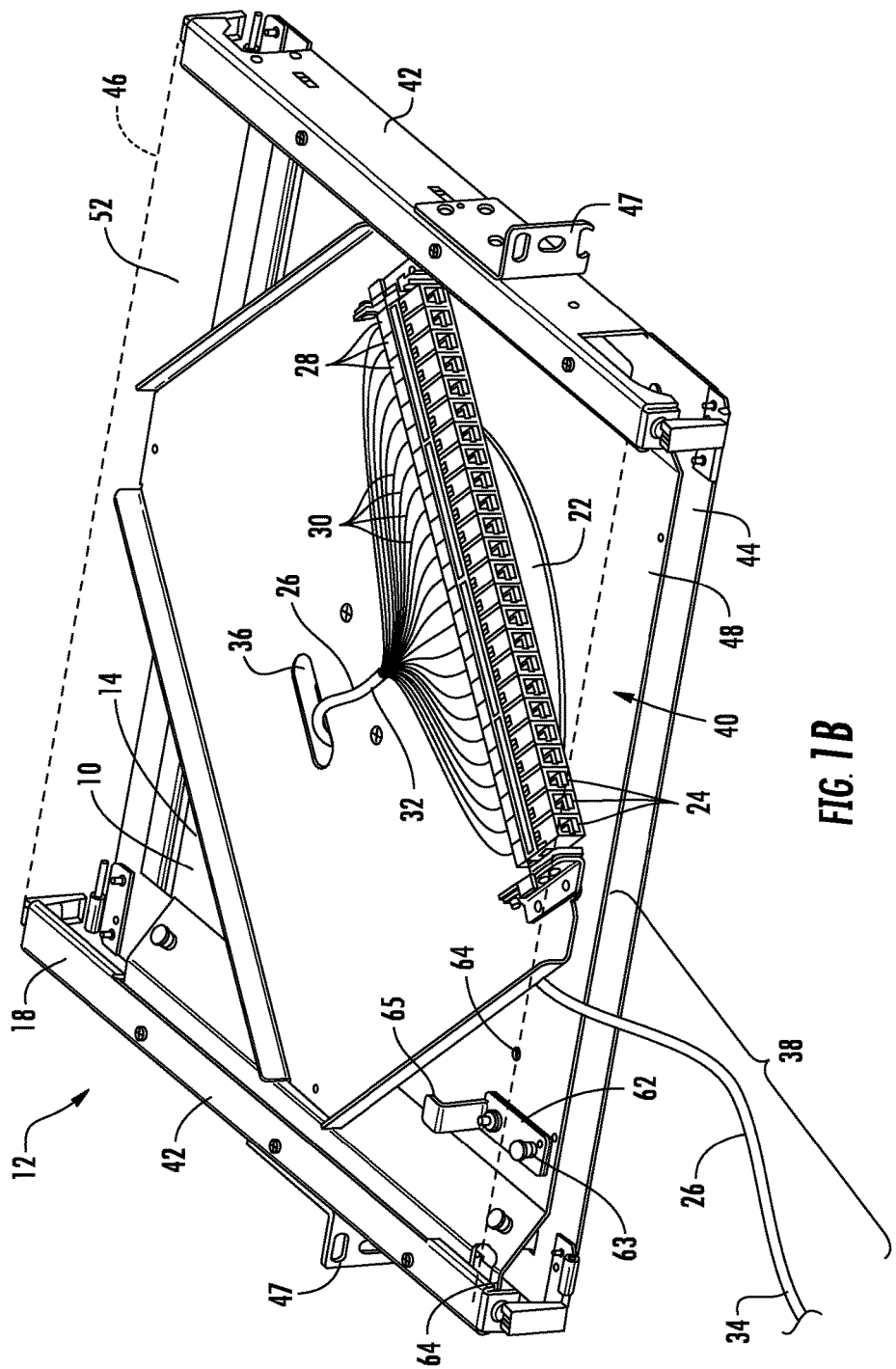
FIG. 1B is an isometric view of the fiber optic chassis of FIG. 1A showing the rotation of the spool within the fiber optic chassis.
Figure 1C:
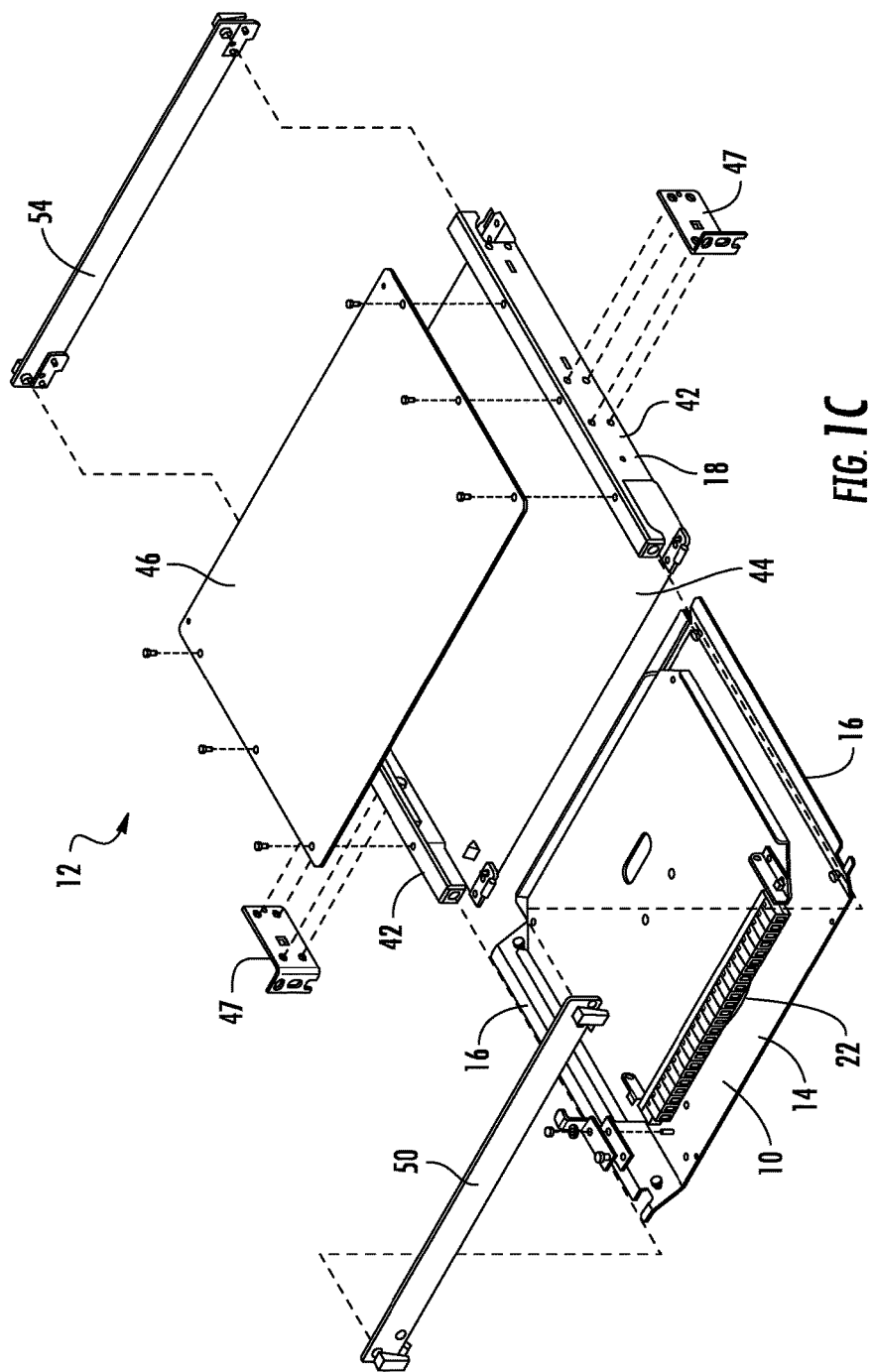
FIG. 1C is an isometric partially-exploded view of the fiber optic chassis of FIGS. 1A and 1B showing the external components of the fiber optic chassis.

Various embodiments will be further clarified by the following examples. In this regard, FIGS. 1A-1C illustrate a fiber optic drawer tray 10 for fiber optic equipment as part of a fiber optic chassis 12. FIG. 1A is an isometric view of the fiber optic chassis 12 and a fiber optic drawer tray 10. FIG. 1B is an isometric view of the fiber optic chassis 12 showing the additional details and functionality of the fiber optic drawer tray 10. FIG. 1C is an isometric partially-exploded view of the external components of the fiber optic chassis 12. Referring now to FIG. 1A, the fiber optic drawer tray 10 has a horizontal base 14 and a pair of housing engagement features 16 on opposite sides of the horizontal base 14. The fiber optic drawer tray 10 is horizontally movable into and out of a drawer housing 18, with each housing engagement feature 16 movably engaging with a complementary tray engagement feature 20 of the drawer housing 18. The fiber optic drawer tray 10 also includes a rotatable spool 22 disposed on the base 14, and a plurality of fiber optic adapters 24 (See FIG. 1B) mounted to rotatable spool 22. The plurality of fiber optic adapters 24 and the rotatable spool 22 are configured to rotate together with respect to the base 14 of the fiber optic drawer tray 10.

As shown by FIG. 1B, the spool 22 is further configured to store a length of fiber optic cable 26 wound around the spool 22. The fiber optic cable 26 is terminated by a plurality of fiber optic connectors 28 connected to the plurality of fiber optic adapters 24, and the spool 22 is configured to continuously rotate for a plurality of revolutions with respect to the base 14 to spool or unspool the fiber optic cable 26 without removing the plurality of fiber optic connectors 28 from the plurality of fiber optic adapters 24. One advantage of this arrangement is that the fiber optic cable 26 can be distributed from the fiber optic drawer tray 10 to any predetermined length without disconnecting the fiber optic cable 26 from the plurality of fiber optic adapters 24, and without the need for additional jumper cables.

In this embodiment, the fiber optic cable 26 has a plurality of optical fibers 30 terminated by the plurality of fiber optic connectors 28 at a first end 32. The fiber optic cable 26 passes through an opening 36 and is wound around the spool 22. A second end 34 of the fiber optic cable 26 is able to be unwound from the spool 22 to provide a predetermined length 38 of fiber optic cable 26 between the second end 34 of the fiber optic cable 26 and the spool 22. To unwind the fiber optic cable 26, the spool 22 is rotated with respect to the base 14 of the fiber optic drawer tray 10.

The fiber optic drawer tray 10 is configured to be horizontally movable with respect an interior volume 40 to the drawer housing 18. In this embodiment, the drawer housing 18 comprises a pair of side walls 42, a bottom panel 44, and a top panel 46 (see FIG. 1C), defining the interior volume 40. A pair of mounting brackets 47 are attached to the side walls 42 to facilitate mounting the drawer housing 18, for example, to a fiber optic equipment rack (not shown). In this embodiment, the drawer housing 18 has a front opening 48, with a movable front door 50, and a rear opening 52, with a movable rear door 54. The fiber optic drawer tray 10 in this embodiment is configured to be horizontally movable into and out of either of the front opening 48 and the rear opening 52.

Each side wall 42 includes a tray engagement feature 20 configured to engage with a complementary housing engagement feature 16 of the fiber optic drawer tray 10. In this embodiment, each housing engagement feature 16 may include a housing engagement rail 56 configured to engage with one or more complementary tray engagement rails 58 of the tray engagement feature 20 (see FIG. 1A). In this embodiment, the housing engagement feature 16 also includes at least one housing engagement stop 60 configured to engage with at least one tray engagement stop 61 of the tray engagement feature 20, in order to inhibit and/or prevent horizontal movement of the fiber optic drawer tray 10 with respect to the drawer housing 18 in one or more predetermined stop positions. The fiber optic drawer tray 10 may also include a spool stop 62 configured to allow or inhibit rotation of the spool 22. The spool stop 62 in this embodiment includes a retention pin 63 for selectively engaging with a complementary recess 64 in the base 14 of the fiber optic drawer tray 10, and a flange 66 for selectively engaging with the spool 22 to permit or inhibit rotation of the spool 22.

Figure 2:
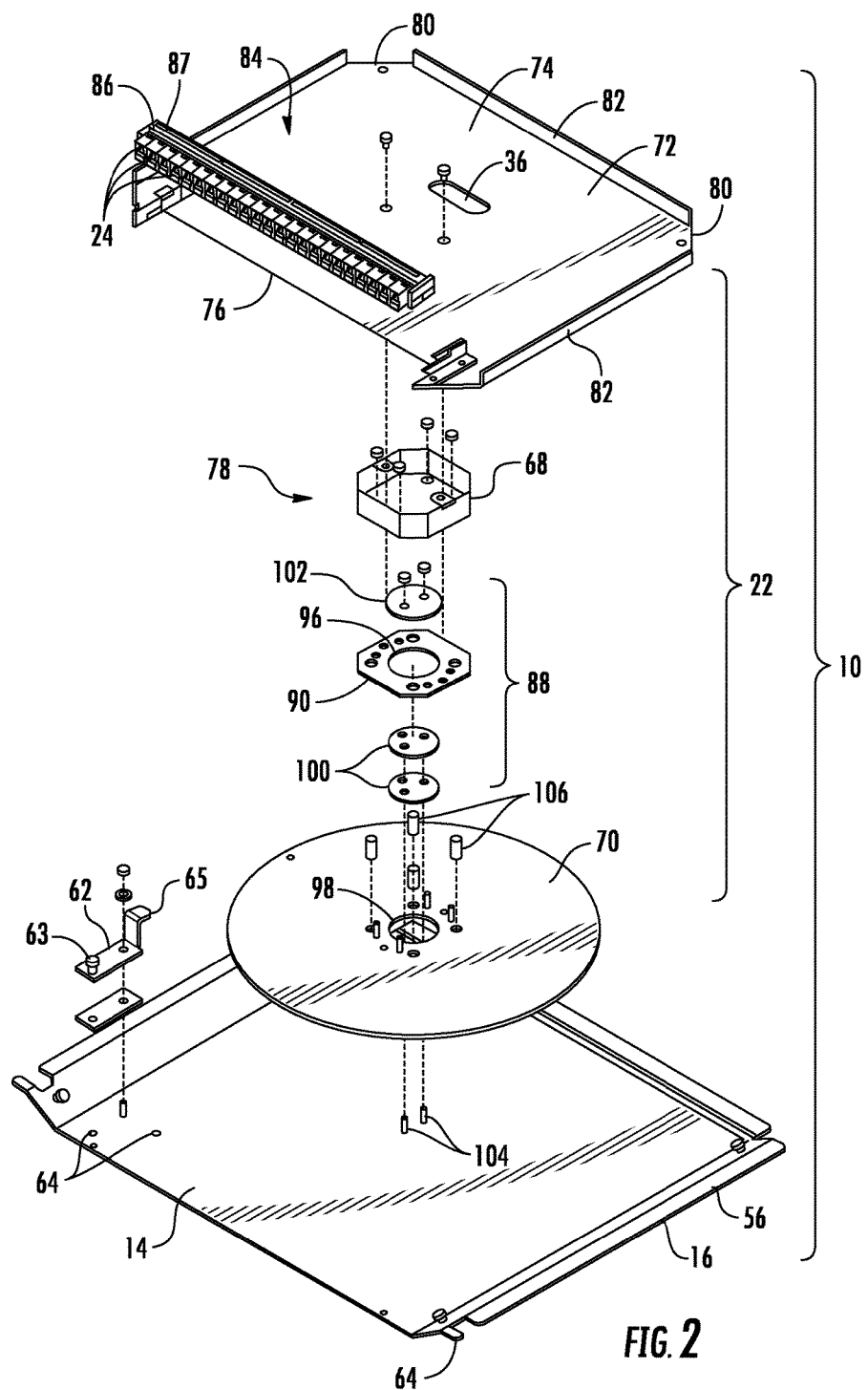
FIG. 2 is an exploded isometric view of the fiber optic drawer tray of FIGS. 1A-1C, illustrating the components and assembly of the fiber optic drawer tray.

The spool 22 has a number of components that facilitate deployment of the fiber optic cable 26. In this regard, FIG. 2 illustrates an exploded isometric view of individual components of the spool 22 and fiber optic drawer tray 10. The spool 22 includes a central spindle member 68 disposed between a bottom flange member 70 and a top tray member 72 having a top surface 74 and a bottom surface 76. The top tray member 72, the bottom flange member 70 and the central spindle member 68 define an interior storage volume 78 for retaining the fiber optic cable 26 when the fiber optic cable 26 is wound around the central spindle member 68. As the spool 22 is rotated to wind and/or unwind the fiber optic cable 26 around the central spindle member 68, the bottom flange member 70 and the top tray member 72 guide and retain the fiber optic cable 26 within the interior storage volume 78 of the spool 22.

In this embodiment, the fiber optic adapters 24 are arranged in an array on the top surface 74 of the top tray member 72. The top tray member 72 in this embodiment has a generally rectangular profile configured to rotate freely within the interior volume 40 of the drawer housing 18 without contacting any part of the drawer housing 18. In this embodiment, the top tray member 72 may have clipped or smoothed corners 80 to facilitate free rotation of the top tray member 72 within the interior volume 40 of the drawer housing 18. The top tray member 72 in this embodiment also includes a plurality of cable guides 82 extending vertically with respect to the top surface 74 of the top tray member 72. The cable guides 82 and the top surface 74 define a slack storage volume 84 for storing and retaining an excess length of the fiber optic cable 26.

In some embodiments, the array of fiber optic adapters 24 is disposed in a removable fiber optic adapter sub-assembly 86. The fiber optic adapter sub-assembly 86 includes an adapter mounting member 87 for accommodating the plurality of fiber optic adapters 24. The adapter mounting member 87 of the fiber optic adapter sub-assembly 86 is selectively removable from the top surface 74 of the top tray member 72, for example, to access the fiber optic adapters 24, the connected fiber optic connectors 28, the individual optical fibers 30, or other portions of the fiber optic cable 26 at the first end 32 of the fiber optic cable 26. Another benefit of the fiber optic adapter sub-assembly 86 being removable from the top surface 74 of the top tray member 72 is that the fiber optic adapter sub-assembly 86 can be removed from the fiber optic drawer tray 10 and the fiber optic chassis 12 without disconnecting the fiber optic connectors 28 of the fiber optic cable 26 from the fiber optic adapters 24 disposed in the fiber optic adapter sub-assembly 86. In addition, the spool 22 remains freely rotatable about the base 14 of the fiber optic drawer tray 10 regardless of whether the fiber optic adapter sub-assembly 86 is connected or disconnected to the top tray member 72 of the spool 22. Thus, the second end 34 of the fiber optic cable 26 can still be wound or unwound around the central spindle member 68 of the spool 22 by rotating the spool 22 when the fiber optic adapter sub-assembly 86 is disconnected from the top surface 74 of the top tray member 72, without disconnecting the fiber optic connectors 28 of the fiber optic cable 26 from the fiber optic adapters 24 disposed in the fiber optic adapter sub-assembly 86.

Figure 3:
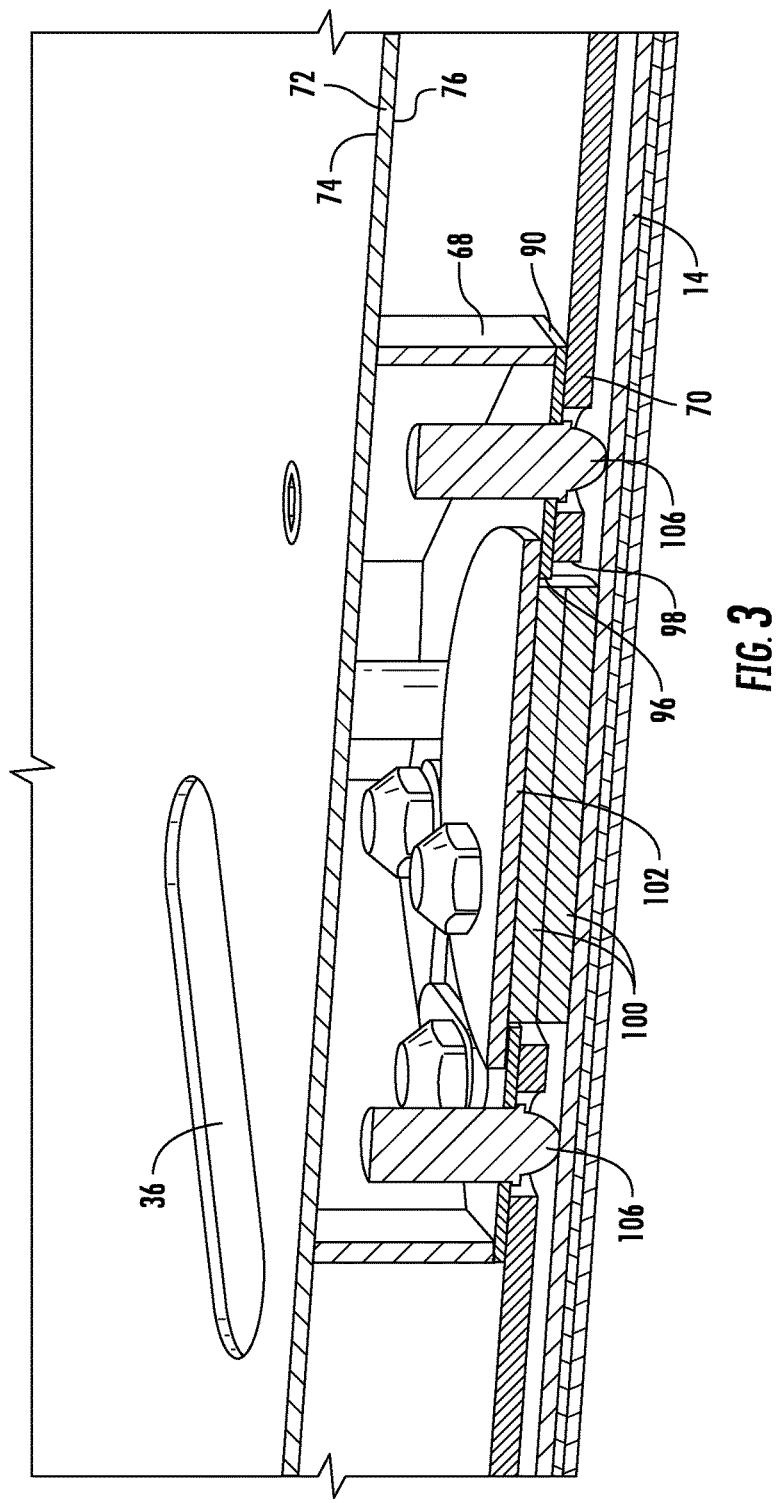
FIG. 3 is a detailed cross-sectional view of the spindle sub-assembly of the spool of the fiber optic drawer tray of FIGS. 1A-2.

In this embodiment, the spool 22 is rotatably attached to the base 14 of the fiber optic drawer tray 10 using a spindle sub-assembly 88. As shown by FIG. 2, an attachment bracket 90 is connected between the central spindle member 68 and the bottom flange member 70. The bottom flange member 70 has a circular flange member opening 94 having a first diameter and the attachment bracket 90 has an attachment bracket opening 96 having a second diameter larger than the first diameter (not shown). A flange sub-assembly 98 is attached to the base 14 of the fiber optic drawer tray 10 to retain the bottom flange member 70. The flange sub-assembly 90 includes at least one central circular member 100 disposed in the flange member opening 94 and having a diameter equal to or less than the first diameter, so that the bottom flange member 70 can freely rotate about the central circular member 100. The flange sub-assembly 98 also includes a retention flange 102 disposed above the central circular member 100 and having a diameter larger than the first diameter and equal to or less than the second diameter, to vertically retain the bottom flange member 70 while allowing the attachment bracket 90 to rotate freely around the retention flange 102. The flange sub-assembly 98 is attached to a plurality of mounting pins 104 in the base 14 of the fiber optic drawer tray 10. The spool 22 is also supported by a plurality of bearings 106 contacting the base 14 of the fiber optic drawer tray 10. These bearings 106 allow the spool 22 to be supported by the base 14 of the fiber optic drawer tray 10 and also allow the spool 22 to rotate about the flange sub-assembly 98 with minimal friction between the bearings 106 and the base 14 of the fiber optic drawer tray 10. In this regard, FIG. 3 is a detailed cross-sectional view of the spindle sub-assembly 88 of the spool 22 of the fiber optic drawer tray 10. As shown by FIG. 3, the spool 22 is retained against the base 14 of the fiber optic drawer tray 10 by the spindle sub-assembly 88, with the spindle sub-assembly 88 permitting free rotation of the spool 22 with respect to the base 14.

Figure 4:
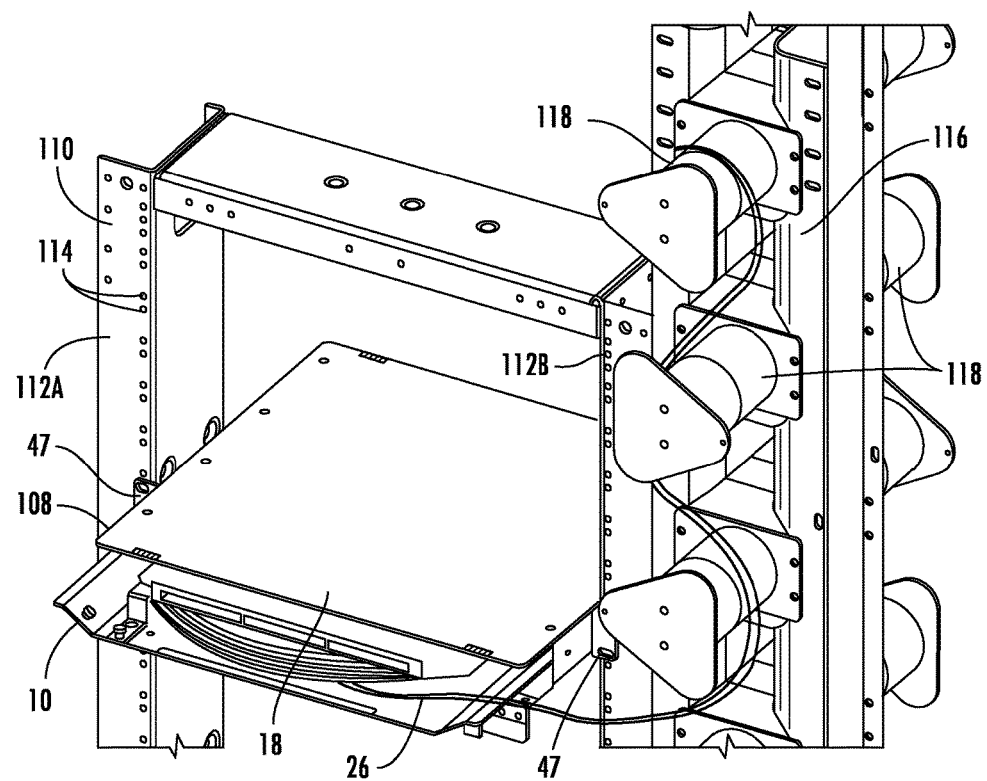
FIG. 4 is an isometric view of a fiber optic chassis similar to the fiber optic chassis of FIGS. 1A-2 installed in a fiber optic equipment rack, according to an embodiment.

In some embodiments, the fiber optic chassis 12 may comprise a chassis defining one or more U space fiber optic equipment units, wherein at least one of the one or more U space fiber optic equipment units is configured to support a given fiber optic connection density or bandwidth in a 1-U space, and for a given fiber optic component type. In this regard, FIG. 4 illustrates a fiber optic equipment chassis 108 similar to the fiber optic chassis 12 of FIGS. 1A-2. The chassis 108 is shown as being installed in a fiber optic equipment rack 110. The fiber optic equipment rack 110 contains two vertical rails 112A, 112B that extend vertically and include a series of apertures 114 for facilitating attachment of the chassis 108 inside the fiber optic equipment rack 110. The chassis 108 is attached and supported by the fiber optic equipment rack 110 in the form of shelves that are stacked on top of each other within the vertical rails 112A, 112B. As illustrated, the chassis 108 is attached to the vertical rails 112A, 112B. The fiber optic equipment rack 110 may support 1-U-sized shelves, with "U" equal to a standard 1.75 inches in height and nineteen (19) inches in width. In certain applications, the width of "U" may be twenty-three (23) inches. Also, the term fiber optic equipment rack 110 should be understood to include structures that are cabinets as well.

The chassis 108 and fiber optic drawer trays 10 support high-density fiber optic equipment and a fiber optic connection density and bandwidth connections in a given space, including in a 1-U space. In this regard, the fiber optic adapters 24 (see FIGS. 1A-2) in this embodiment can be provided such that at least twenty-four (24) simplex or twelve (12) duplex fiber optic connectors 28 can be disposed across of the width of the front side or face of the drawer housing 18, as an example, without interfering with the rotation of the spool 22 within the interior volume 40 of the drawer housing 18.

In another embodiment, if multi-fiber fiber optic components were installed in the fiber optic adapter sub-assembly 86, such as MPO components for example, higher fiber optic connection density and bandwidths would be possible using a drawer housing 18 of similar dimensions. For example, if up to ten (10) twelve (12) fiber MPO fiber optic components were disposed in fiber optic adapter sub-assembly 86, and one (1) fiber optic drawer tray 10 were included in a drawer housing 18 occupying a 1-U space, the drawer housing 18 would support up to one hundred-twenty (120) fiber optic connections in a 1-U space. If up to ten (10) twenty-four (24) fiber MPO fiber optic components were disposed in fiber optic adapter sub-assembly 86, and one (1) fiber optic drawer tray 10 were included in a drawer housing 18 occupying a 1-U space, the drawer housing 18 would support up to two hundred forty (240) fiber optic connections in a 1-U space.

The fiber optic equipment rack 110 may also include one or more guide rail portions 116, having a plurality of cable guides 118. The cable guides 118 may guide the fiber optic cable 26 between the chassis 108 and other fiber optic equipment, and may also function as slack storage for excess fiber optic cable 26 and to prevent excess strain or tension on the fiber optic cable 26.

Figure 5:
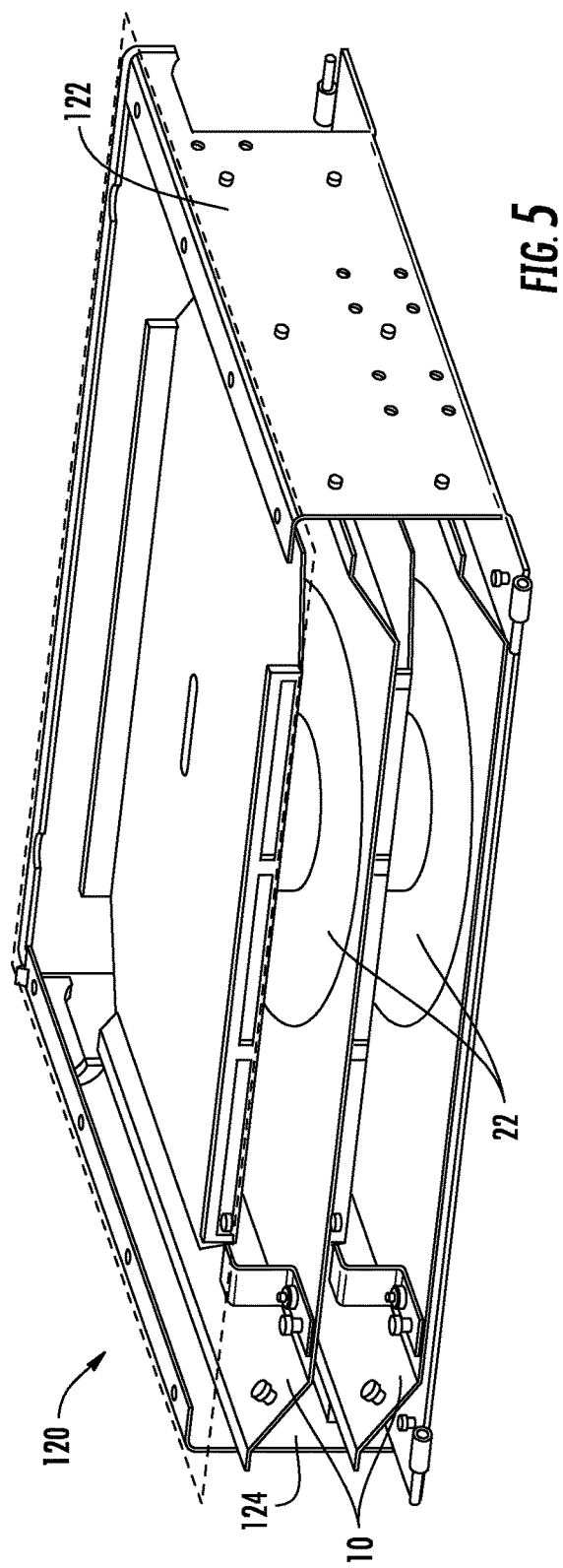
FIG. 5 is an isometric view of a fiber optic chassis configured to occupy a 2-U space according to an alternative embodiment.
Figure 6:
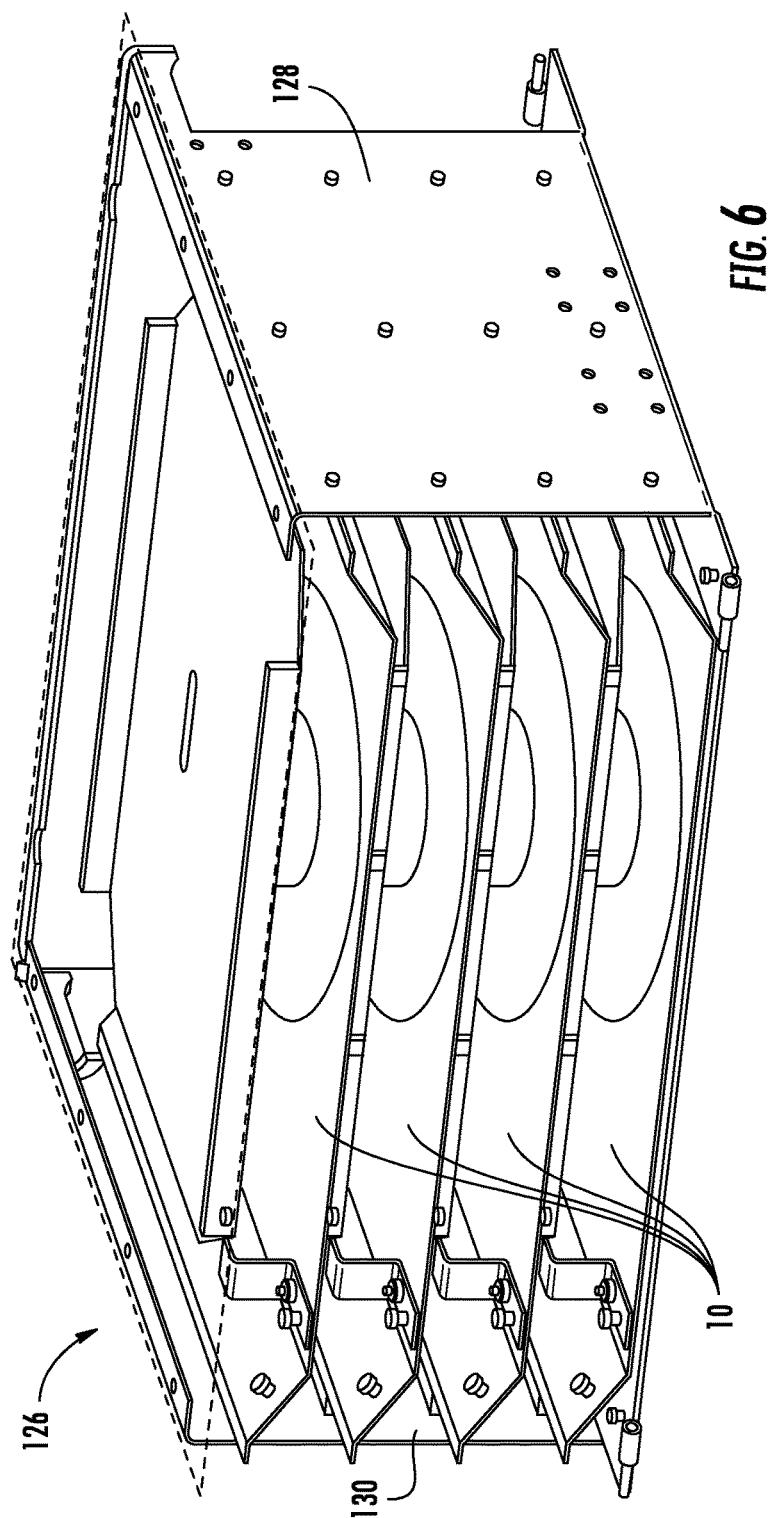
FIG. 6 is an isometric view of a fiber optic chassis configured to occupy a 4-U space according to an alternative embodiment.

In this embodiment, the chassis 108 is 1-U in size; however, the chassis 108 could be provided in a size greater than 1-U as well. In this regard, FIG. 5 illustrates a fiber optic chassis 120 having a drawer housing 122 configured to occupy a 2-U space. The drawer housing 122 is configured to accommodate two (2) vertically stacked fiber optic drawer trays 10 within a single interior volume 124. In another embodiment, FIG. 6 illustrates a fiber optic chassis 126 having a drawer housing 128 configured to occupy a 4-U space. The drawer housing 128 is configured to accommodate four (4) vertically stacked fiber optic drawer trays 10 within a single interior volume 130.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic drawer tray for fiber optic equipment, the fiber optic drawer tray comprising:
   A substantially horizontal base;
   a pair of housing engagement features disposed on opposite sides of the horizontal base, each housing engagement feature of the pair of housing engagement features configured to movably engage with at least one tray engagement feature of a drawer housing;
   a rotatable spool disposed on the base; and
   a fiber optic adapter sub-assembly mounted to the rotatable spool, the fiber optic adapter sub-assembly configured to receive and retain a plurality of fiber optic adapters, the fiber optic adapter sub-assembly and the rotatable spool configured to rotate together with respect to the base of the fiber optic drawer tray;
   wherein the rotatable spool is configured to store a length of a fiber optic cable wound around the rotatable spool, the fiber optic cable comprising a plurality of optical fibers terminated by a plurality of connectors configured to be disposed in the plurality of fiber optic adapters in the fiber optic adapter sub-assembly, and
   wherein the rotatable spool is continuously rotatable for a plurality of revolutions with respect to the base to spool or unspool the fiber optic cable without removing the plurality of connectors from the plurality of adapters in the fiber optic adapter sub-assembly.

2. The fiber optic drawer tray of claim 1, wherein the rotatable spool further comprises:
   a spindle member having a bottom end proximate to the base and a top end;

a bottom flange member attached to the bottom end of the spindle member; and a top tray member having a top surface and a bottom surface, the top tray member attached to a top end of a spool member;

wherein the bottom flange member and the top tray member define a storage volume for retaining the fiber optic cable when the fiber optic cable is wound around the spindle member of the rotatable spool.

3. The fiber optic drawer tray of claim 2, wherein the fiber optic adapter sub-assembly is configured to receive and retain the plurality of fiber optic adapters in a horizontal array on the top surface of the top tray member.

4. The fiber optic drawer tray of claim 2, wherein the top tray has an opening configured to guide the fiber optic cable between the fiber optic adapter sub-assembly and the storage volume.

5. The fiber optic drawer tray of claim 1, further comprising at least one spool stop configured to selectively inhibit rotation of the rotatable spool with respect to the base.

6. The fiber optic drawer tray of claim 1, wherein each of the pair of housing engagement features comprises at least one horizontal rail configured to movably engage with the at least one tray engagement feature of the drawer housing.

7. The fiber optic drawer tray of claim 1, wherein each of the at least one tray engagement features comprises at least one complementary horizontal rail configured to slidably engage at least one of the horizontal rail of the housing engagement features.

8. The fiber optic drawer tray of claim 1, further comprising at least one drawer stop configured to selectively inhibit horizontal movement of the fiber optic drawer tray with respect to the drawer housing.

9. A fiber optic chassis comprising:
a drawer housing defining an interior volume, the drawer housing comprising:
a pair of side walls on opposite sides of the interior volume, each side wall having at least one tray engagement feature;
at least one fiber optic drawer tray for fiber optic equipment, each fiber optic drawer tray comprising:
a substantially horizontal base;
a pair of housing engagement features disposed on opposite sides of the horizontal base, each housing engagement feature of the pair of housing engagement features configured to movably engage with one of at least one tray engagement feature of the drawer housing, such that fiber optic drawer tray is horizontally movable into and out of the interior volume of the drawer housing;
a rotatable spool disposed on the base; and
a fiber optic adapter sub-assembly mounted to the rotatable spool, the fiber optic adapter sub-assembly configured to receive and retain a plurality of fiber optic adapters, the fiber optic adapter sub-assembly and the rotatable spool configured to rotate together with respect to the base of the fiber optic drawer tray;
wherein the rotatable spool is configured to store a length of fiber optic cable wound around the rotatable spool, the fiber optic cable comprising a plurality of optical fibers terminated by a plurality of connectors configured to be disposed in the plurality of fiber optic adapters in the fiber optic adapter sub-assembly; and
wherein the rotatable spool is continuously rotatable for a plurality of revolutions with respect to the base to spool or unspool the fiber optic cable without removing the plurality of connectors from the plurality of adapters in the fiber optic adapter sub-assembly.

10. The fiber optic chassis of claim 9, wherein each rotatable spool further comprises:
a spindle member having a bottom end proximate to the respective base and a top end;
a bottom flange member attached to the bottom end of the spindle member; and
a top tray member having a top surface and a bottom surface, the top tray attached to the top end of the spool member,
wherein the bottom flange member and the top tray member define a storage volume for retaining the fiber optic cable when the fiber optic cable is wound around the spindle member of the rotatable spool.

11. The fiber optic chassis of claim 10, wherein the fiber optic adapter sub-assembly is configured to receive and retain the plurality of fiber optic adapters in a horizontal array on the top surface of the top tray member.

12. The fiber optic chassis of claim 10, wherein the top tray of each rotatable spool has an opening configured to guide the respective fiber optic cable between the respective fiber optic adapter sub-assembly and the respective storage volume.

13. The fiber optic chassis of claim 9, each fiber optic drawer tray comprising at least one spool stop configured to selectively inhibit rotation of the rotatable spool with respect to the base.

14. The fiber optic chassis of claim 9, wherein each housing engagement feature of each pair of housing engagement features comprises at least one horizontal rail configured to movably engage with the at least one tray engagement feature of the drawer housing.

15. The fiber optic chassis of claim 9, wherein each of the at least one tray engagement features comprises at least one complementary horizontal rail configured to slidably engage at least one of the horizontal rail of the housing engagement features.

16. The fiber optic chassis of claim 9, wherein the housing comprises at least one first drawer stop, and
wherein each fiber optic drawer tray further comprises at least one second drawer stop configured to engage with the at least one first drawer stop to selectively inhibit a horizontal movement of the fiber optic drawer tray with respect to the drawer housing.

17. A method of storing fiber optic cable, the method comprising:
providing a fiber optic cable having a first end and a second end, the fiber optic cable comprising a plurality of optical fibers, each of the plurality of optical fibers terminated with fiber optic connectors at the first end of the fiber optic cable;
connecting each of the plurality of fiber optic connectors to a plurality of fiber optic adapters in a fiber optic adapter sub-assembly, the fiber optic adapter sub-assembly connected to a rotatable spool rotatably mounted to a base of a fiber optic drawer tray; and
continuously rotating the rotatable spool in a first direction for a plurality of revolutions with respect to the base of the fiber optic drawer tray such that the fiber optic cable winds around the rotatable spool without removing the plurality of fiber optic connectors from the plurality of fiber optic adapters.

18. The method of claim 17, further comprising:
continuously rotating the rotatable spool in a second direction opposite the first direction for a plurality of revolutions to unwind a predetermined length of the fiber optic cable between the second end of the fiber optic cable and the rotatable spool without removing the plurality of fiber optic connectors from the plurality of fiber optic adapters; and horizontally moving the fiber optic drawer tray into an interior volume of a drawer housing such that the predetermined length of the fiber optic cable extends out of the interior volume of the drawer housing.

19. The method of claim 17, further comprising:

horizontally moving the fiber optic drawer tray out of an interior volume of a drawer housing;

continuously rotating the rotatable spool in a second direction opposite the first direction for a plurality of revolutions to unwind the fiber optic cable from the rotatable spool without removing the plurality of fiber optic connectors from the plurality of fiber optic adapters;

disconnecting the plurality of fiber optic connectors from the plurality of fiber optic adapters after continuously rotating the rotatable spool in the second direction for the plurality of revolutions; and removing the fiber optic cable from the rotatable spool.

20. A method of distributing fiber optic cable, the method comprising:

horizontally moving a fiber optic drawer tray out of an interior volume of a drawer housing, continuously rotating a rotatable spool rotatably mounted to the fiber optic drawer tray for a plurality of revolutions with respect to a base of the fiber optic drawer tray to unwind a predetermined length of the fiber optic cable between the second end of the fiber optic cable and the rotatable spool without removing the plurality of fiber optic connectors from the plurality of fiber optic adapters.

21. The method of claim 20, further comprising horizontally moving the fiber optic drawer tray into an interior volume of a drawer housing such that the predetermined length of the fiber optic cable extends out of the interior volume of the drawer housing.

22. The method of claim 20, further comprising:

horizontally moving the fiber optic drawer tray out of an interior volume of a drawer housing prior to continuously rotating the rotatable spool for the plurality of revolutions;

disconnecting the plurality of fiber optic connectors from the plurality of fiber optic adapters after continuously rotating the rotatable spool in the second direction for the plurality of revolutions; and removing the fiber optic cable from the rotatable spool.

* * * * *